United States Patent
Lausser et al.

(10) Patent No.: US 7,350,617 B2
(45) Date of Patent: Apr. 1, 2008

(54) METHOD FOR MOUNTING A STEERING ANGLE AND STEERING TORQUE SENSOR AND STEERING GEAR INCLUDING A STEERING ANGLE AND STEERING TORQUE SENSOR

(75) Inventors: Christof Lausser, Krefeld (DE); Ingo Becker, Linnich (DE)

(73) Assignee: TRW Automotive GmbH (DE)

( * ) Notice: Subject to any disclaimer, the term of this patent is extended or adjusted under 35 U.S.C. 154(b) by 342 days.

(21) Appl. No.: 11/238,093

(22) Filed: Sep. 28, 2005

(65) Prior Publication Data

US 2006/0065473 A1    Mar. 30, 2006

(30) Foreign Application Priority Data

Sep. 28, 2004    (DE) .................. 10 2004 046 946

(51) Int. Cl.
B62D 15/02    (2006.01)
(52) U.S. Cl. ................................................. 180/444
(58) Field of Classification Search ................ 180/443, 180/444, 446
See application file for complete search history.

(56) References Cited

U.S. PATENT DOCUMENTS

| | | | | |
|---|---|---|---|---|
| 4,867,688 A | * | 9/1989 | Suzuki ...................... | 439/15 |
| 5,243,188 A | * | 9/1993 | Hattori et al. ............ | 250/231.17 |
| 6,366,080 B1 | * | 4/2002 | Eberhart et al. ........ | 324/207.22 |
| 6,844,541 B2 | * | 1/2005 | Alsobrooks et al. .... | 250/231.13 |
| 7,147,496 B2 | * | 12/2006 | Kuerschner .............. | 439/164 |
| 2004/0173734 A1 | | 9/2004 | Alsobrooks et al. | |
| 2005/0116561 A1 | * | 6/2005 | Matsubara et al. ...... | 310/83 |
| 2007/0099465 A1 | * | 5/2007 | Ruetz ........................ | 439/164 |

FOREIGN PATENT DOCUMENTS

| | | |
|---|---|---|
| DE | 37 03 591 A1 | 8/1988 |
| DE | 197 03 903 A1 | 8/1998 |
| DE | 197 18 723 A1 | 11/1998 |
| DE | 199 35 583 A1 | 11/2000 |
| EP | 1 388 484 A1 | 2/2004 |
| EP | 1 413 499 A1 | 4/2004 |

* cited by examiner

Primary Examiner—Kevin Hurley
(74) Attorney, Agent, or Firm—MacMillan, Sobanski & Todd, LLC

(57) ABSTRACT

A method for mounting a steering angle and steering torque sensor to a steering has the following steps: At first, there is provided a steering angle and steering torque sensor which includes a housing and a rotor. Then, the rotor and the housing are rotated through a predetermined angular amount with respect to a zero position, and the rotor is attached to a steering shaft that is provided with a pinion toothing. Finally, the steering shaft is inserted into a steering gear which includes a toothed rack, the housing being fixed in place at the steering gear in a predetermined angular position, and the steering shaft being rotated together with the rotor by the pinion toothing engaging in the toothed rack, until the rotor has returned to the zero position relative to the housing.

5 Claims, 4 Drawing Sheets

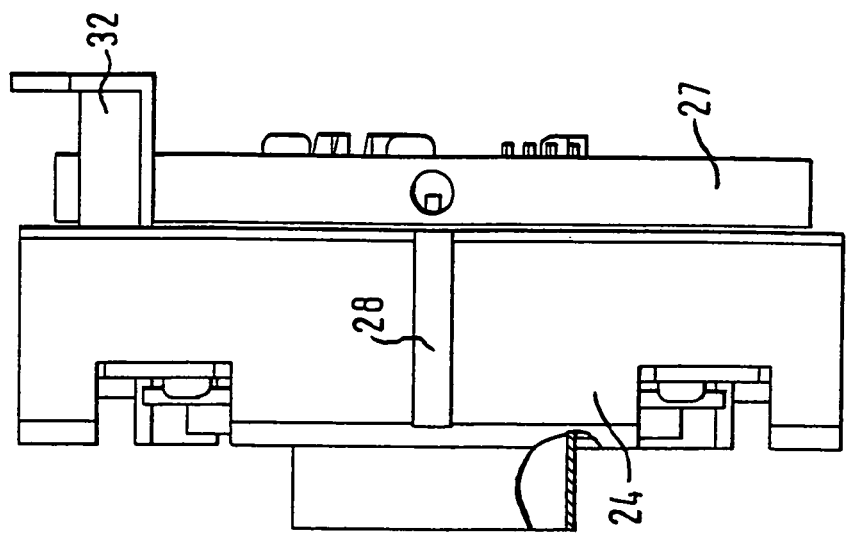
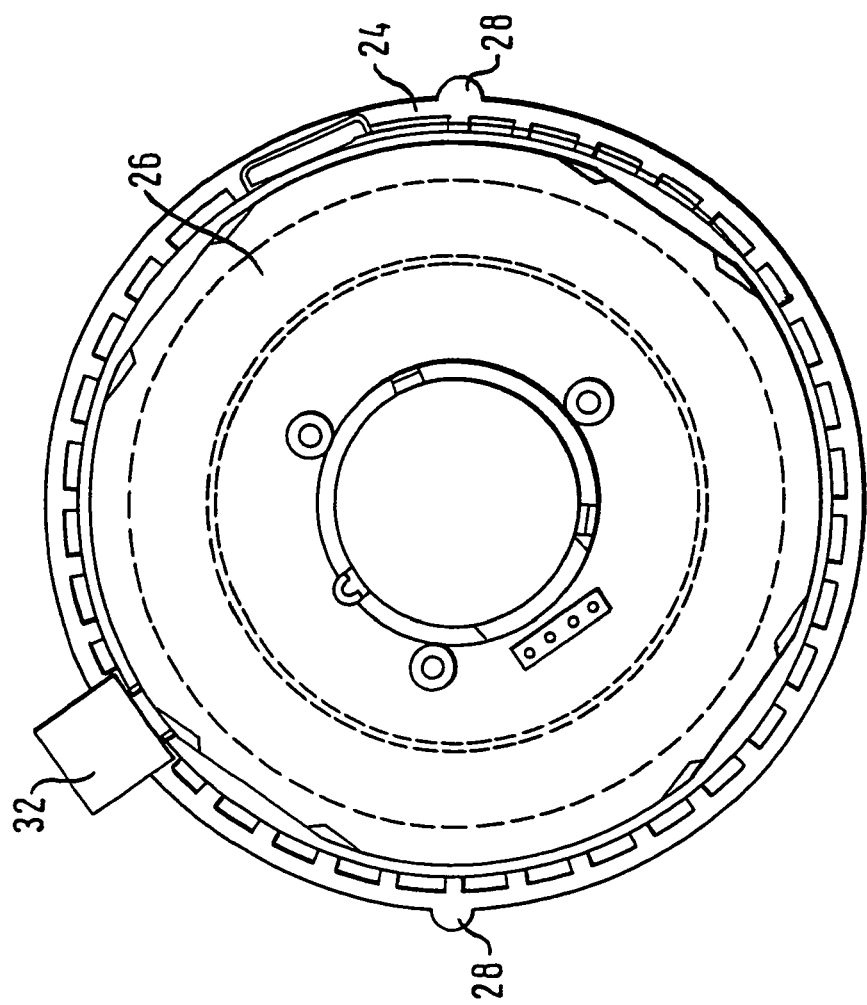

METHOD FOR MOUNTING A STEERING ANGLE AND STEERING TORQUE SENSOR AND STEERING GEAR INCLUDING A STEERING ANGLE AND STEERING TORQUE SENSOR

CROSS-REFERENCE TO RELATED APPLICATIONS

This application claims priority of German Patent Application No. 10 2004 046 946.6 filed Sep. 28, 2004, the disclosures of which are incorporated herein by reference.

BACKGROUND OF THE INVENTION

The invention relates to a method for mounting a steering angle and steering torque sensor to a steering gear. The invention further relates to a steering gear including a steering angle and steering torque sensor.

In modern steering systems, the steering angle and steering torque sensor is used to make various data available to a control unit of a power steering system or an electronic stability program. In these arrangements, mounting the sensor in the steering gear is problematic. If the steering gear is in the zero position, which corresponds to the vehicle driving straight ahead, the steering angle sensor should emit a signal which likewise corresponds to the zero position. This could be ensured, if all steering gear components were assembled, were brought into the zero position, and if only then the sensor could firmly be connected to the steering shaft and the housing of the steering gear. For spatial reasons, however, this is not possible, since after mounting the sensor in the steering gear the various components are hardly accessible.

BRIEF SUMMARY OF THE INVENTION

The invention provides a method for mounting a steering angle and steering torque sensor to a steering gear, and a steering gear in which, when the steering gear is in the zero position, the sensor likewise is with high accuracy in the zero position.

The following steps are provided for in accordance with the invention in a method for mounting a steering angle and steering torque sensor to a steering gear:

There is provided a steering angle and steering torque sensor which includes a housing and a rotor. The rotor is rotated relative to the housing through a predetermined angular amount with respect to a zero position. The rotor is attached to a steering shaft that is provided with a pinion toothing. The steering shaft is inserted into a steering gear which includes a toothed rack, the housing being fixed in place at the steering gear in a predetermined angular position, and the steering shaft being rotated together with the rotor by the pinion toothing engaging in the toothed rack, until the rotor returns to the zero position relative to the housing. The method in accordance with the invention is founded on the basic idea "to detune" the sensor by exactly that angular amount through which the steering shaft is bound to be rotated when it is mounted in the steering gear. Since the steering shaft engages in the toothed rack of the steering gear without play, the rotation of the steering shaft resulting from the assembly may be determined with high accuracy. If prior to the assembly the rotor and the housing of the sensor are rotated with respect to one another with the same high accuracy, the zero position of the sensor will be obtained after the assembly with a correspondingly high accuracy. The sole assembly step that is tolerance-afflicted, namely the rotation of the housing and the rotor of the sensor with respect to one another, may be carried out in a state in which all components are well accessible, namely outside the steering gear.

It can be seen that the two steps "rotating the sensor out of the zero position" and "mounting the rotor to the steering shaft" may be carried out in any order. It is obvious as well that the idea in accordance with the invention may also be put into practice by moving the toothed rack of the steering gear out of its zero position prior to the assembly, whilst inserting the steering shaft into the steering gear along with a sensor being in the zero position. When the steering shaft is inserted, the latter rotates, so that the sensor is rotated out of its zero position. In so doing, the sensor reaches a position that is rotated with respect to the zero position to such an extent that it corresponds to the position of the toothed rack moved out of the zero position. As soon as the toothed rack is returned to the zero position, the sensor reassumes its zero position as well.

In order to achieve the aforementioned object, there is also provided a steering gear comprising a steering angle and steering torque sensor, the sensor including a housing and a rotor, the housing being fixed in place at the steering gear by means of a sliding guide. The sliding guide ensures that the sensor housing is coupled so as to be non-rotatable relative to the steering gear.

Other advantages of this invention will become apparent to those skilled in the art from the following detailed description of the preferred embodiments, when read in light of the accompanying drawings.

BRIEF DESCRIPTION OF THE DRAWINGS

FIG. 4 shows a top view of the steering angle and steering torque sensor used with the steering gear of FIG. 1; and FIG. 5 shows the sensor of FIG. 4 in a side view.

DETAILED DESCRIPTION OF THE INVENTION

Figure 1:
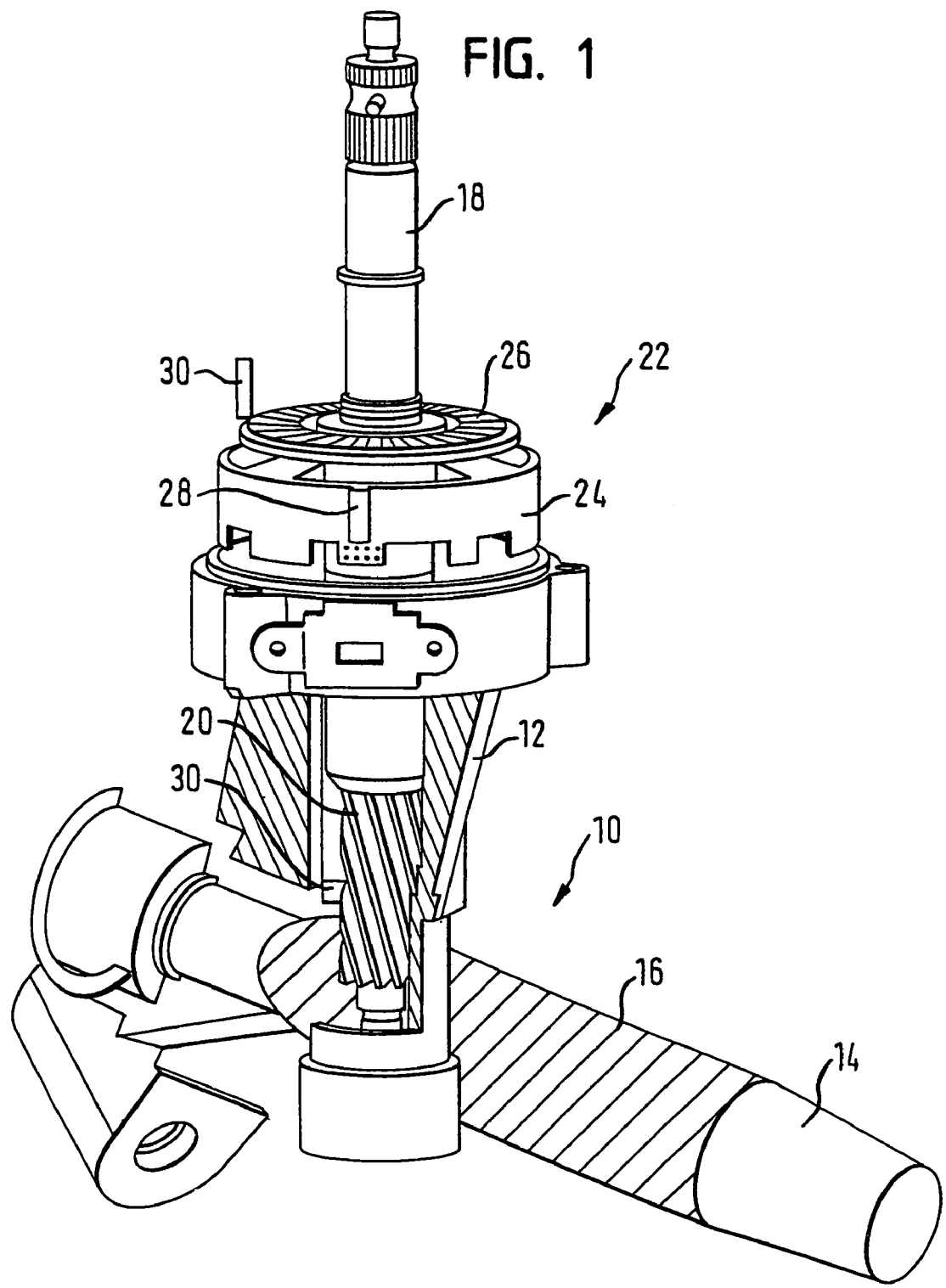
FIG. 1 shows in a perspective, partially sectioned view a steering gear on commencement of the assembly.

FIG. 1 schematically shows a steering gear 10 which includes a steering gear housing 12, a toothed rack 14 displaceably disposed therein and having a toothing 16, and a steering shaft 18. The steering shaft includes a pinion toothing 20 which serves to engage in the toothing 16 of the toothed rack 14. Both the toothing 16 and the pinion toothing 20 are helical toothings. A steering angle and steering torque sensor 22 is further attached to the steering shaft 18 (see also FIGS. 4 and 5). The essential components of this steering angle and steering torque sensor are a housing 24 and a rotor 26. The housing 24 serves to be firmly disposed at the steering gear 10, and the rotor 26 is attached to the steering shaft 18 so as to be non-rotatable in relation thereto. The housing 24 also comprises a volute spring housing 27 in the interior of which there is arranged a volute spring enabling an electric connection to various rotor components via several rotations in either direction.

On its outside the housing 24 of the sensor 22 is provided with two protruding noses 28 which serve to fix the housing in place relative to the steering shaft housing 12. For this purpose the steering shaft housing includes complementarily shaped recesses. A sliding guide is formed in this manner. At the housing 24 there is further provided a plug connector 29 in which a complementary plug connector may engage, so that the sensor 22 may be connected to a control electronics.

For assembling the steering gear 10, the toothed rack 14 is placed in the steering gear housing 12 into its center position or zero position. Besides, the sensor 22 is attached to the steering shaft 18. More precisely, the rotor 26 of the sensor 22 is attached to the steering shaft 18 so as to be non-rotatable in relation thereto. For this purpose noses, grooves, splined shaft toothings, or other constructions may be used. Then, the rotor 26 is rotated out of the zero position relative to the housing 24 through a predetermined angular amount. This is indicated in FIG. 1 by positioning marks 30, which are shown by way of explanation and which correspond to the zero position, being rotated through about 90° with respect to the zero position. The zero position corresponds to the nose 28 at the housing 24 as apparent in FIG. 1. In this rotated position, the rotor 26 is arrested relative to the housing 24 by an arresting means 32 (see FIGS. 4 and 5). This arresting means 32 is in particular a clip that engages in suitable recesses at the rotor 26 and the housing 24, and arrests the sensor in its position of being rotated out of the zero position. The angular amount through which the rotor 26 is rotated out of the zero position relative to the housing 24 will be apparent from the following explanations. It is obvious that the rotor 26 may also be rotated relative to the housing 24, before the sensor 22 is attached to the steering shaft 18.

Figure 2:
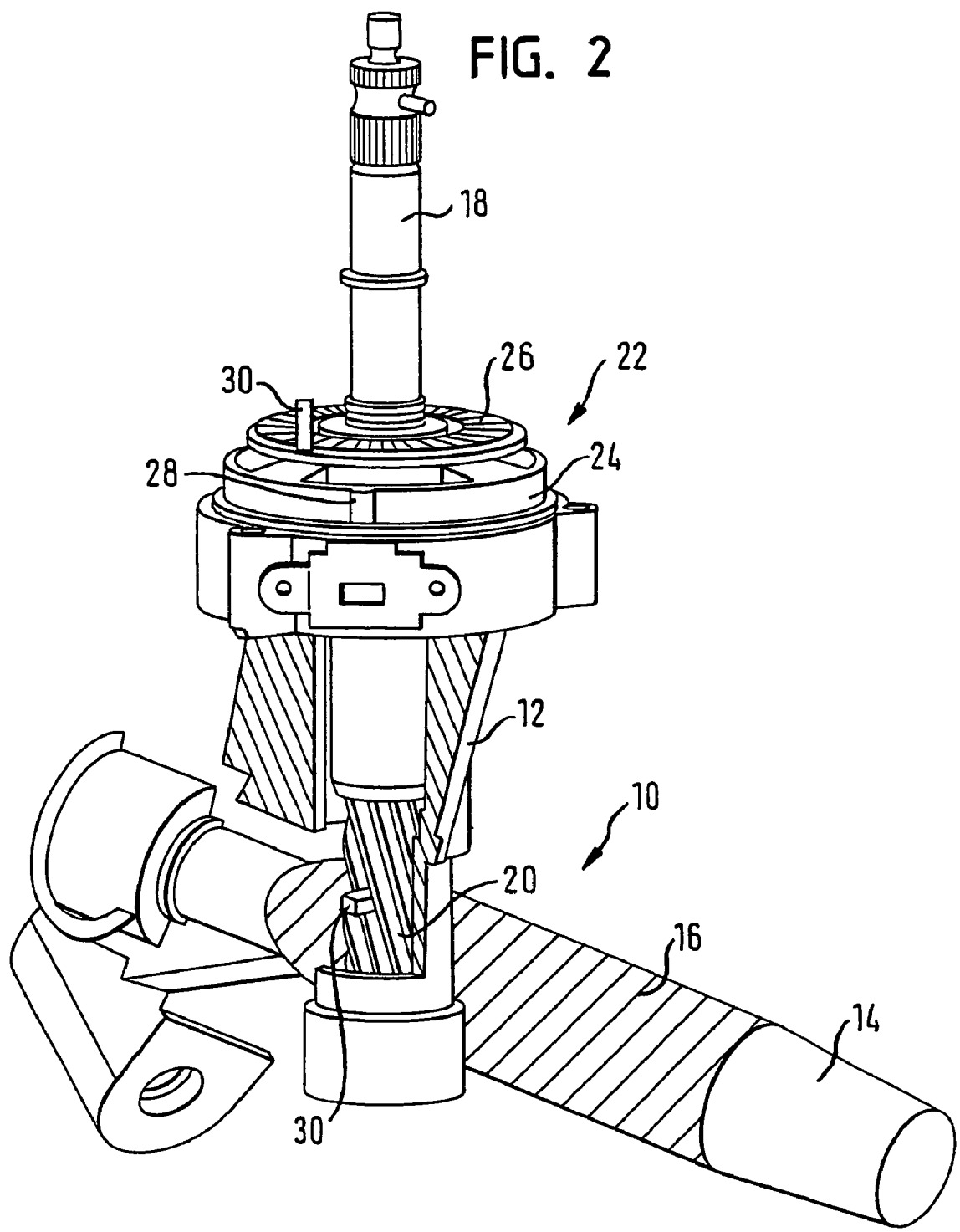
FIG. 2 shows the steering gear of FIG. 1 during assembly.

When the steering shaft 18 is inserted into the steering gear housing 12 together with the sensor 22 mounted thereto, it is first of all oriented visually correctly and inserted with the pinion toothing 20 in the toothed rack. This is possible without any problems, because the pinion toothing, corresponding to the number of its teeth, specifies only few positions which differ from one another in their orientation to such an extent that visually alone the correct one may be chosen. Then, the steering shaft is inserted into the housing, until the noses 28 at the housing 24 of the sensor 22 engage in the associated recesses at the steering gear housing 12 and correctly position the housing 24. After the noses 28 of the housing 24 of the sensor 22 are fixed in place relative to the steering gear housing 12, the arresting means 32 is removed. When the steering shaft 18 is continued to be inserted, the steering shaft 18 is rotated relative to the housing 24 of the sensor 22, since the pinion toothing 20, together with the toothing 16 of the toothed rack 14, causes a constrained rotation, whilst the housing 24 of the sensor 22 is non-rotatably held relative to the steering gear housing 12 via the noses 28. FIG. 2 shows the steering shaft 18 while being inserted into the steering gear housing 12; in so doing, the steering shaft 18 has approached the zero position starting from its rotated position. Accordingly, the positioning marks 30 have moved closer to the zero position.

Figure 3:
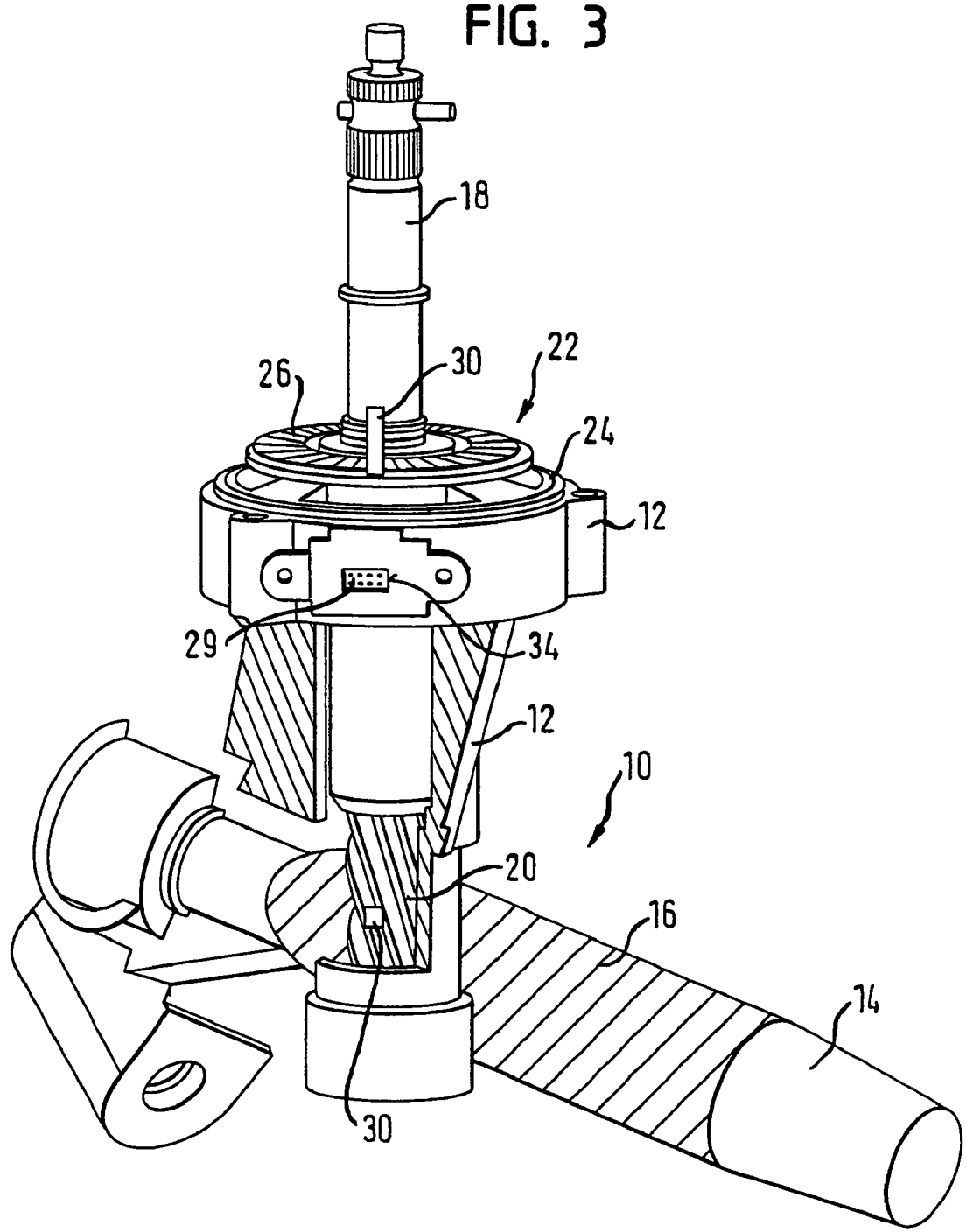
FIG. 3 shows the steering gear of FIG. 1 in the assembled state.

FIG. 3 shows the steering gear 10 with the steering shaft 18 completely inserted. By the pinion toothing 20 engaging in the toothing 16 of the toothed rack 14, the steering shaft 18 has rotated back to its zero position or center position.

Accordingly, also the rotor 26 is again in the zero position relative to the housing 24 of the sensor 22. The positioning marks 30 are correspondingly on the same radius as the nose at the housing 24 as shown in FIG. 1. Therefore, the recesses, in which the arresting means 32 had been inserted at the housing 24 and the rotor 26, are rotated with respect to one another through that angular amount through which the sensor 22 had been rotated out of its zero position prior to the assembly. The plug connector 29 is now situated behind a recess 34 in the steering gear housing 12, so that it may be contacted without any problems by means of a complementary plug connector. The latter also provides for the required sealing arrangement in the region of the recess 34.

It is apparent from the description of the assembly process that the predetermined angular amount through which the rotor 26 was rotated relative to the housing 24 of the sensor 22 out of the zero position is equal to the angular amount through which the steering shaft 18 is rotated when it is inserted into the steering gear housing 12 by the two helical toothings engaging in one another.

In accordance with the provisions of the parent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method for mounting a steering angle and steering torque sensor to a steering gear, comprising the following steps:
    providing a steering angle and steering torque sensor which includes a housing and a rotor;
    rotating said rotor relative to said housing through a predetermined angular amount with respect to a zero position;
    attaching said rotor to a steering shaft which is provided with a pinion toothing; and
    inserting said steering shaft into a steering gear which includes a toothed rack, said housing being fixed in place at said steering gear in a predetermined angular position, and said steering shaft being rotated together with said rotor by said pinion toothing engaging in said toothed rack until said rotor has returned to said zero position relative to said housing.

2. The method according to claim 1, wherein said rotor is arrested in said rotated position relative to said housing.

3. A steering gear comprising a steering angle and steering torque sensor, said sensor including a housing and a rotor, said housing being fixed in place at said steering gear by means of a sliding guide.

4. The steering gear according to claim 3, wherein the steering gear includes a recess, and the housing is provided with a plug connector which is disposed behind said recess.

5. The steering gear according to claim 3, wherein said housing and said rotor are provided with a mount for an arresting means.

* * * * *